United States Patent [19]
Enokida et al.

[11] Patent Number: 6,124,404
[45] Date of Patent: Sep. 26, 2000

[54] PROCESS FOR PRODUCING FLUORINE-CONTAINING GRAFT COPOLYMER

[75] Inventors: Takashi Enokida; Hideo Aoki; Okimasa Yamada; Yasunori Yanai, all of Kitaibaraki, Japan

[73] Assignee: Nippon Mektron Limited, Tokyo, Japan

[21] Appl. No.: 09/203,423

[22] Filed: Dec. 2, 1998

[30] Foreign Application Priority Data

Dec. 19, 1997 [JP] Japan ................................. 9-365141

[51] Int. Cl.⁷ .................................................. C08F 259/08
[52] U.S. Cl. ........................ 525/276; 526/247; 526/249; 526/254; 526/255
[58] Field of Search ............................ 525/276; 526/247, 526/249, 254, 255

[56] References Cited

U.S. PATENT DOCUMENTS

| | | | |
|---|---|---|---|
| 4,948,852 | 8/1990 | Moore | 526/247 |
| 5,447,994 | 9/1995 | Kruger et al. | 525/276 |

FOREIGN PATENT DOCUMENTS

| | | |
|---|---|---|
| 53-3495 | 1/1978 | Japan . |
| 58-206615 | 12/1983 | Japan . |
| 61-49327 | 10/1986 | Japan . |
| 7-316246 | 12/1995 | Japan . |
| 10-130341 | 5/1998 | Japan . |

*Primary Examiner*—James J. Seidleck
*Assistant Examiner*—Olga Asinovsky
*Attorney, Agent, or Firm*—Baker & Daniels

[57] ABSTRACT

A fluorine-containing graft copolymer produced by copolymerizing at least two kinds of monomers selected from the group consisting of fluorinated monomers and propylene in the presence of a saturated iodine-containing compound or an iodine and bromine-containing compound, and further graft copolymerizing the resulting copolymer with tetrafluoroethylene and polyfluorovinyl ether represented by the general formula:

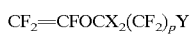

$$CF_2=CFOCX_2(CF_2)_pY$$

(where X is H or F, Y is H or F and p is 0–3), where an unsaturated iodine-containing compound or an unsaturated bromine-containing compound may be used together with the saturated iodine-containing compound or iodine and bromine-containing compound. The resulting fluorine-containing graft copolymer is a thermoplastic fluorine-containing copolymer elastomer capable of giving molding products having a distinguished compression set in a high temperature region such as about 280° C. or higher and thus is suitably used as molding materials for sealing materials, etc.

12 Claims, No Drawings

PROCESS FOR PRODUCING FLUORINE-CONTAINING GRAFT COPOLYMER

BACKGROUND OF THE INVENTION

1. Field of the Invention

The present invention relates to a process for producing a fluorine-containing graft copolymer, and more particularly to a process for producing a thermoplastic fluorine-containing graft copolymer.

2. Description of Related Art

Fluorine-containing copolymers are polymeric materials having a distinguished resistances to heat and chemicals. Above all, fluorine-containing copolymer elastomers have been widely used as sealing materials for O-rings, packings, oil seals, etc. or as molding materials for hoses, etc., calling for a heat resistance and an oil resistance. However, vulcanization products of the fluorine-containing copolymer elastomers have a difficulty in recycling of burrs and scraps due to their insolubility and non-meltability. Furthermore, the vulcanization process itself requires an enormous amount of energy and a precise process control.

Thermoplastic elastomers, on the other hand, are easy about recycle of burrs and scraps because of possible omission of vulcanization step itself and thus can be said as materials suitable for nowadays social demands such as resource saving and low waste discharge. Furthermore, the thermoplastic elastomers have a self-reinforcability and thus basically do not require any addition of a reinforcing filler. That is, the thermoplastic elastomers can be appropriately used in applications, where the filler pollution is a problem, such as fields of medicine, food, semiconductor device production, etc.

So far known thermoplastic fluorine-containing copolymer elastomers are disclosed typically in the following documents:

JP-A-53-3495 discloses production of a multi-segmented polymer, at least one of whose polymer chain segments is a fluorine-containing polymer chain segment, as shown by the following formula:

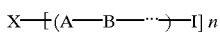

where X: residue freed from iodine of an iodide compound, and

A, B, . . . :polymer chain segments, by successively polymerizing monomers, which are to constitute respective polymer chain segments so as to form at least two kinds of polymer chain segments between the carbon-iodine bond of the iodide compound when at least two kinds of radical-polymerizable monomers are polymerized in the presence of the iodide compound having a carbon-bonded iodine. The resulting multi-segmented polymer has a good rubber resiliency, but does not always satisfy the compression set characteristics, which is a practically important characteristics of sealing materials.

JP-A-61-49327 discloses a fluorine-containing segmented polymer, which comprises a chain of 2 or 3 polymer chain segments and, an iodine atom at one end of the chain and a residue freed from at least one iodine atom of an iodide compound at the other end of the chain, where one kind of polymer chain segment (in case of the chain consisting of two polymer chain segments) or one or two kinds of polymer chain segments (in case of the chain consisting of three polymer chain segments) is an elastomeric polymer chain segment having a molecular weight of 30,000 to 1,200,000, selected from (1) VdF/HFP/TFE (molar ratio= 45–90:5–50:0–35) polymer and (2) FAVE/TFE/VdF (molar ratio:15–75: not more than 85:0–85) polymer, and the remaining polymer chain segment or segments are non-elastomeric polymer chain segments having a molecular weight of 3,000 to 400,000, selected from (3) VdF/TFE (molar ration=0–100:100:0) polymer and (4) ethylene/TFE (molar ratio=40–60:60–40) polymer, a ratio by weight of the elastomeric polymer chain segment to the non-elastomeric polymer chain segment being 40–95:60–5. The fluorine-containing segmented polymer also has a distinguished rubber resiliency, but does not always satisfy the compression set characteristic, which is a practically important characteristic of sealing materials. The foregoing abbreviations correspond to the following compounds:

VdF: vinylidene fluoride

HFP: hexafluoropropene

TFE: tetrafluoroethylene

FAVE : perfluoro(alkyl vinyl ether) having a $C_1$–$C_3$ alkyl group

JP-A-58-206615 discloses production of flexible fluoro resins by preparing a fluorine-containing elastic copolymer having a glass transition temperature equal to room temperature or less at the first stage by copolymerizing at least one kind of monomers including at least one kind of fluorine-containing monomers with a monomer having a double bond and a peroxy bond simultaneously in the molecule, thereby introducing the peroxy group into the copolymer molecule, and graft copolymerizing the copolymer obtained at the first stage in an aqueous emulsion or a dispersing solvent with at least one kind of monomers including at least one kind of fluorine-containing monomers, capable of giving a crystalline polymer having a melting point of 130° C. or higher at the second stage.

The fluoro resins obtained by the process require no crosslinking treatment and can be easily molding-processed to give molding products having good mechanical characteristics and proper applicability as sealing materials, but their specific embodiments typically as given in Example 1 show the necessity for a series of complicated steps of emulsion polymerization—salting out water washing-solvent washing-drying-graft polymerization (solution polymerization—solvent separation drying. Thus, the process is not preferable from the viewpoint of production cost.

The present inventors, previously proposed a fluorine-containing graft copolymer, which was a thermoplastic fluorine-containing copolymer elastomer having an improved compression set characteristic and properly applicable as molding materials for sealing materials or the like, prepared by copolymerizing at least two kinds of monomers selected from the group consisting of fluorinated monomers and propylene in the presence of (A) a saturated, iodine-containing compound represented by the following general formula:

where R is a fluorohydrocarbon group, a chlorofluorohydrocarbon group, a chlorohydrocarbon group or a hydrocarbon group and n is 1 or 2, or an iodine and bromine-containing compound represented by the following general formula:

where R is a fluorohydrocarbon group, a chlorofluorohydrocarbon group, a chlorohydrocarbon group or a hydrocarbon group and n and m are each 1 or 2, and (B) an unsaturated fluorohydrocarbon or an unsaturated hydrocarbon, each of which contains an iodine atom or a bromine atom, and then graft polymerizing the resulting copolymer with at least one kind of monomer selected from the group consisting of fluorinated monomers and ethylene (JP-A-10-130341).

However, the thus obtained fluorine-containing graft copolymer has a melting point Tm of about 160° to about 280° C. and is not satisfactory for application to molding materials for sealing materials requiring a higher heat resistance. In other words, among the resistance to chemicals and the heat resistance (oxidation resistance) due to the C—F bonds of fluorine-containing copolymer the heat resistance characteristics has not been fully satisfied yet.

On the other hand, JP-A-7-316246 discloses thermoplastic elastomers having a distinguished compression set characteristic. The thermoplastic elastomers have a block structure composed of at least one of elastic type A fluorinated polymer segments and at least one of plastomeric type B fluorinated polymer segments, at least one of type A or type B segments being composed of a unit derived from an olefin iodide represented by the following general formula:

$$CH_2=CXRfCHRI$$

where X: H, F or $CH_3$ and Rf: (per)fluoroalkylene group or (per)fluoropolyoxyalkylene group.

Even such thermoplastic elastomers have a melting point Tm as low as about 165° C., and furthermore the olefin iodide represented by the forgoing general formula has a high production cost and their compression set (120° C., 24 hr.) is about 53%. Thus, the thermoplastic elastomers can be said to have no such properties as to meet the expended costs.

SUMMARY OF THE INVENTION

An object of the present invention is to provide a process for producing a thermoplastic fluorine-containing copolymer elastomer capable of giving molding products having distinguished mechanical characteristics, particularly compression set characteristic, in a high temperature range of about 280° C. or higher and properly applicable to molding materials for sealing materials or the like.

The object of the present invention can be attained by producing a fluorine-containing graft copolymer by copolymerizing a mixture of at least two kinds of monomers selected from the group consisting of fluorinated monomers and propylene in the presence of a saturated iodine-containing compound represented by the following general formula:

$$RI_n$$

where R is a fluorohydrocarbon group, a chlorofluorohydrocarbon group, a chlorohydrocarbon group or a hydrocarbon group and n is 1 or 2, or an iodine and bromine-containing compound represented by the following general formula:

$$I_nBrmR$$

where R is a fluorohydrocarbon group, a chlorofluorohydrocarbon group, a chlorohydrocarbon group or a hydrocarbon group and n and m are each 1 or 2, and further graft polymerizing the resulting copolymer with tetrafluoroethylene and a polyfluorovinyl ether represented by the following general formula:

$$CF_2=CFOCX_2(CF_2)_pY$$

where X is a hydrogen atom or a fluorine atom, Y is a hydrogen atom or a fluorine atom and p is an integer of 0 or 1 to 3, where an unsaturated iodine-containing compound or an unsaturated bromine-containing compound may be used together with the saturated iodine-containing compound or the iodine and bromine-containig compound.

DETAILED DESCRIPTION OF THE INVENTION

The first stage of polymerization reaction is carried out as copolymerization reaction of a mixture of at least two kinds of monomers selected from the group consisting of fluorinated monomers and propylene in the presence of the said saturated iodine-containing compound or iodine and bromine-containig compound.

Fluorinated monomers for use in the present invention include, for example, vinylidene fluoride, hexafluoropropene, tetrafluoroethylene, chlorotrifluoroethylene, perfluoro(methyl vinyl ether), etc. At least two kinds of these fluorinated monomers and propylene can be used in the copolymerization reaction, but at least one kind thereof must be selected from hexafluoropropene, chlorotrifluoroethylene, perfluoro (methyl vinyl ether) and propylene, which all have a property to destruct the crystallinity of copolymer, and among which chlorotrifluoroethylene is preferably used. These monomers can be used in a proportion of about 10 to about 80% by mole, preferably about 20 to about 60% by mole, in the monomer mixture.

The saturated iodine-containing compound represented by the said general formula for use in the present invention includes, for example, 1,2-diiodoperfluoroethane, 1,3-diiodoperfluoropropane, 1,4-diiodoperfluorobutane, 1,6-diiodoperfluorohexane, 1,8-diiodoperfluorooctane, etc., among which 1,4-diiodoperfluorobutane is preferably used.

The iodine and bromine-containing compound represented by the said general formula is selected from those which cannot lose the effects through side reactions under polymerization conditions, wherein R is selected from fluorohydrocarbon groups, chlorofluorohydrocarbon groups, chlorohydrocarbon groups or hydrocarbon groups generally having 1 to 10 carbon atoms, and each of the groups may have a functional group such as —O—, —S—, =NR, —COOH, —$SO_2$, —$SO_3H$, —$PO_3H$, etc.

Such iodine and bromine-containing compound may be a saturated or unsaturated linear or aromatic compound, wherein n and m each are preferably 1. The iodine and bromine-containing compound where at least one of n and m is 2 produces a fluorine-containing elastomer of three-dimensional structure, and thus is desirable to use within such a range as not to deteriorate the processability.

The linear iodine and bromine-containing compound includes, for example, 1-bromo-2-iodoperfluoroethane, 1-bromo-3-iodoperfluoropropane, 1-bromo-4-iodoperfluorobutane, 2-bromo-3-iodoperfluorobutane, 1-bromo-2-iodoperfluoro-(2-methylpropane), monobromomonoiodoperfluorocyclobutane, monobromomonoiodoperfluoropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2- bromoperfluoroethane, 1-bromo-2-iodo-1,2,2-trifluoroethane, 1-iodo-2-bromo-1,2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromo-perfluorobutane, 1,4-dibromo-2-iodo-3, 3,4,4-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2,3-dibromo-2-iodoperfluoropropane, 1,3-diiodo-2-bromo-perfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutane-1, 3-iodo-4-perfluorobutene-1, 1-bromo-4-iodoperfluorobutene-1, 1-iodo-4-bromoperfluorobutene-1, 3-bromo-4-iodo-3,4,4-trifluorobutene-1, 4-bromo-3-iodo-3,4,4-trifluorobutene-1, 3-bromo-4-iodo-1,1,2-trifluorobutene-1, 4-bromo-5-iodoperfluoropentene-1, 4-iodo-5-bromoperfluoro-pentene-1, 4-bromo-5-iodo-1,1,2-trifluoropentene-1, 4-iodo-5-bromo-1,1,2-trifluoropentene-1, 1-bromo-2-iodoperfluoroethyl perfluoromethyl ether, 1-bromo-2-iodoperfluoroethyl perfluoroethyl ether, 1-bromo-2-iodoperfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl methyl ether, 1-iodo-2-bromoethyl ethyl ether, 1-bromo-2-iodoethyl-2'-chloroethyl ether, etc. These iodine and bromine-containing compounds can be prepared according to an appropriate, known process; for example, a monobromomonoiodo, fluorine-containing olefin can be obtained by allowing a fluorine-containing olefin to react with iodine bromide.

The aromatic, iodine and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1bromo, 1-(2-iodoethyl)-4-(2-bromoethyl), 1-(2-iodoethyl)-3-(2-bromoethyl), 1-(2-iodoethyl)-4-(2-bromoethyl), 3,5-bis(2-bromoethyl)-1-(2-iodoethyl), 3,5-bis(2-iodoethyl)-1-(2-bromethyl), 1-(3-iodopropyl)-2-(3-bromopropyl), 1-(3-iodopropyl)-3-(3-bromopropyl), 1-(3-iodopropyl)-4-(3-bromopropyl), 3,5-bis(3-bromopropyl)-1-(3-iodopropyl), 1-(4-iodobutyl)-3-(4-bromobutyl), 1-(4-iodobutyl)-4-(4-bromobutyl), 3,5-bis(4-iodobutyl)-1-(4-bromobutyl), 1-(2-iodoethyl)-3-(3-bromopropyl), 1-(3-iodopropyl)-3-(4-bromobutyl), 3,5-bis-(3-bromopropyl)-1-(2-iodoethyl), 1-iodo-3-(2-bromoethyl), 1-iodo-3-(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc., and perfluorobenzenes having a substituent group substituent group such as 1-iodo-2bromo, 1-iodo-3-bromo, 1-iodo-4-bromo, 3,5-dibromo-1-iodo, 3,5-diiodo-1-bromo, etc.

Use of either the saturated iodine-containing compound or the iodine and bromine-containing compound depends on molding conditions of fluorine-containing graft copolymer, etc. That is, the fluorine-containing graft copolymer obtained according to the present process has a high melting point and thus requires high temperature molding. In case where coloring of molding product is undesirable, the iodine and bromine-containing compound is used and in case where the molding products are to be vulcanized at a high speed or coloring is not a problem, the saturated iodine-containing compound is used.

Together with these saturated iodine-containing compound or iodine and bromine-containing compound as a component (A), an unsaturated iodine-containing compound or an unsaturated bromine-containing compound as a component (B) can be used. Such an unsaturated iodine-containing or bromine-containing compound includes, for example, unsaturated iodine-containing compounds such as iodotrifluoroethylene, perfluoro(2-iodethyl vinyl ether), etc. or unsaturated bromine-containing compounds such as 2-bromo-1,1-difluoroethylene, bromotrifluoroethylene, 4-bromo-3,3,4,4-tetrafluorobutene-1, perfluoro(2-bromoethyl vinyl ether), etc. Either the iodine-containing compound or the bromine-containing compound can be selected according to the same rule as in the case of saturated iodine-containing compound or iodine and bromine-containing compound. Above all, 2-bromo-1,1-difluoroethylene is a particularly preferable compound.

When these components (A) and (B) are to be used simultaneously, the component (A) and the component (B) are used generally in a molar ratio of about 2/1 to about 1/2, preferably about 1.5/1 to 1/1.5. It is practically preferable to select the ratio in view of a difference in the reactivity between the respective components. Total amounts of the component (A) and the component (B) to be used depends on the necessity for the proportion of iodine and/or bromine to be made present in the copolymer obtained by the first stage polymerization reaction and also on the copolymerizability of both components in the first stage polymerization reaction. For example, in case of combination of 1-bromo-2-iodotetrafluoroethane and 2-bromo-1,1-difluoroethylene, it is preferable to make these two components so present in the polymerization reaction system as to accomplish proportions of about 0.005 to about 0.025 m mole of combined iodine/g of copolymer and about 0.015 to about 0.025 m mole of combined bromine/g of copolymer at the same time. Needless to say, mechanical characteristics of molding products can be improved by use of relatively expensive component (B), but it is remarkable that the component (A) alone can provide practically satisfactory mechanical characteristics in a high temperature conditions. When copolymerization reaction is to be carried out by use of component (A) alone, for example, 1,4-diiodooctafluorobutane alone, it is preferable to make the component (A) so present in the polymerization reaction system as to accomplish a proportion of about 0.02 to about 0.04 m mole of combined iodine/g of copolymer.

Copolymerization reaction can be carried out by any polymerization procedure, for example, by emulsion polymerization, suspension polymerization, solution polymerization, bulk polymerization or the like, but the emulsion polymerization procedure is preferable from the viewpoint of higher degree of polymerization and economy. Emulsion polymerization reaction can be carried out under pressure of generally about 0 to about 100 kg/cm$^2$ gage, preferably about 10 to about 50 kg/cm$^2$ gage and at a temperature of generally about 0° to about 100° C., preferably about 20° to 80° C., using a water-soluble inorganic peroxide such as ammonium persulfate, etc. or a redox system thereof with a reducing agent, as a catalyst, and ammonium perfluorooctanoate, ammonium perfluoroheptanoate, ammonium perfluorononanoate, etc. or a mixture thereof, preferably ammonium perfluorooctanoate, as an emulsifier, where to adjust pH of the polymerization reaction system an electrolyte having a buffer function such as $Na_2HPO_4$, $NaH_2PO_4$, $KH_2PO_4$, etc. or sodium hydroxide may be added thereto. The component (A) and the component (B) have a chain transferability and thus it is usually not necessary to add a chain transfer agent thereto, but, if required, such a chain transfer agent as ethyl maloate, acetone, isopropanol, etc. can be properly added thereto.

The copolymer so obtained by the first stage polymerization reaction is graft coporimerized with tetrafluoroethylene and the polyfluorovinyl ether represented by the said general formula. Polyfluorovinyl ether for use in the present invention is, for example, at least one kind of $CF_2\!=\!CFOCF_3$, $CF_2\!=\!CFOCF_2CF_3$, $CF_2\!=\!CFOCF_2CF_2CF_3$, $CF_2\!=\!CFOCH_2CF_2CF_3$, $CF_2\!=\!CFOCH_2CF_2CF_2H$, etc., among them $CF_2\!=\!CFOCH_2CF_2CF_3$ is preferably used from the viewpoint of copolymerization reactivity with tetrafluoroethylene.

When the first stage polymerization reaction is carried out by emulsion polymerization or solution polymerization, the graft copolymerization reaction is carried out by cooling the aqueous latex or solution obtained by the first stage polymerization, purging the unreacted monomers and then adding tetrafluoroethylene and polyfluorovinyl ether thereto to conduct polymerization reaction.

Tetrafluoroethylene and polyfluorovinyl ether can be used in a proportion of the latter of about 0.5 to about 6% by mole, preferably about 1 to about 5% by mole in the total amounts. When, for example, $CF_2\!=\!CFOCH_2CF_2CF_3$ is used in a proportion of 1% by mole as polyfluorovinyl ether, the resulting fluorine-containing graft copolymer has a melting point Tm of about 317° C. and thus can undergo molding processing, but in case of lower copolymerization proportion than 1% by mole, tetrafluoroethylene will be in too large a proportion and the molding processability will be considerably deteriorated. On the other hand, when the graft copolymerization is carried out in a proportion of 6% by mole of polyfluorovinyl ether, the resulting graft copolymer has a melting point Tm of about 280° C. and the molding processing can be carried out easily, but in a higher copolymerization proportion than 6% by mole, no clear melting point Tm is shown any more and the resulting molding products have no satisfactory mechanical characteristics, either.

Monomers to be used in the first stage polymerization reaction and monomers to be used in the second stage graft reaction are in a ratio of generally about 50/50 to about 90/10, preferably about 60/40 to about 80/20. Practically, the ratio depends on how to set a balance between the elastomeric property and the non-elastomeric property to be given to the desired graft copolymer. That is, in a region of high ratio of monomers used in the first stage polymerization reaction the characteristics as themoplastic elastomer will be pronounced, whereas with an increasing ratio of monomers used in the second stage graft reaction the characteristics as flexible resin will be pronounced, and thus a ratio of the former monomer to the latter monomers depends on characteristics desired for the resulting graft copolymer.

The second stage graft copolymerization reaction is carried out in the same manner as in the first stage copolymerization reaction. After the graft copolymerization reaction, products can be separated from the reaction mixture by coagulation in case of emulsion polymerization or by distilling off the solvent in case of solution polymerization, and then are subjected to water washing or solvent washing and drying.

The resulting fluorine-containing graft copolymer (which can be considered as graft and block copolymer) can be directly molded in various forms such as O-rings, oil seals, tubes, sheets, etc. by various molding procedures, for example, by injection molding, compression molding, blow molding or the like, or can be further admixed with a cocrosslinking agent of polyfunctional unsaturated compound such as tri(meta)allyl isocyanurate, triallyl trimellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. or an organic peroxide such as 2,5-dimethyl-2,5-bis(t-butylperoxy)hexane, 2,5-dimethyl-2,5-bis(t-butylperoxy)hexine-3, benzoyl peroxide, bis(2,4-dichlorobenzoyl)peroxide, dicumyl peroxide, di-t-butyl peroxide, t-butylcumyl peroxide, t-butylperoxybenzene, 1,1-bis(t-butylperoxy)-3,5,5-trimethylcylohexane, 2,5-dimethylhexane-2,5-dihydroxyperoxide, α, α'-bis(t-butylperoxy)-p-diisopropylbenzene, 2,5-dimethyl-2,5-di(benzoyl-peroxy)hexane, t-butylperoxyisopropyl carbonate, etc. together therewith to conduct peroxide vulcanization molding. In that case, an oxide or hydroxide of a divalent metal such as calcium, magnesium, lead, zinc, etc. can be used as a crosslinking promoter, depending on the desired requirements. Furthermore, radiation crosslinking can be applied.

The present fluorine-containing graft copolymer can give molding products having distinguished mechanical characteristics, particularly compression set, in a high temperature range, and thus can be effectively used as molding materials for sealing materials such as O-rings, packings, oil seals, gaskets, etc. and also for hoses, etc.

PREFERRED EMBODIMENTS OF THE INVENTION

The present invention will be described in detail below, referring to Examples and Comparative Examples.

EXAMPLE 1

10 g of ammonium perfluorooctanoate, 2 g of sodium hydroxide (for pH adjustment) and 5 L of deionized water were charged into an autoclave having a net capacity of 10 L and then the autoclave was fully flushed at the inside space with a nitrogen gas. Then, 14.98 g of 1,4-diiodoperfluorobutane was introduced therein under pressure.

Then, a gas mixture consisting of:

| | |
|---|---|
| vinylidene fluoride [VdF] | 70 mol. % |
| chlorotrifluoroethylene [CTFE] | 30 mol. % | was introduced therein under pressure until the inside pressure reached to 15 $kg/cm^2$ gage, and then the inside temperature was elevated to 70° C.

Then, an aqueous solution of polymerization initiator prepared by dissolving 5 g of ammonium persulfate into 150 ml of water was introduced into the autoclave under pressure to initiate polymerization reaction. Immediately thereafter, operation of introducing the gas mixture of the said composition as an additional gas therein under pressure until the inside pressure reaches to 22 kg/cm² gage was repeated until the solid concentration of the resulting latex unreached to 25 wt. %. When the desired solid concentration was reached, unreacted gas was immediately purged from the autoclave to discontinue the reaction.

A portion of the resulting aqueous latex was admixed with an aqueous 5 wt. % potassium alum solution to coagulate the resulting binary copolymer, followed by water washing and drying. For the binary copolymer, copolymer composition (by $^{19}$F-NMR), iodine content (by elemental analysis) and solution viscosity η sp/c [specific viscosity in 1 wt. % dimethylformamide (DMF) solution at 35° C.] were determined.

Then, 1,700 g of the aqueous latex (425 g in terms of the binary copolymer) was charged into an autoclave having a net capacity of 3 L, and the autoclave was fully flushed at the inside space with a nitrogen gas. Then, 2.3 g of $CF_2$=$CFOCH_2C_2F_5$ and 97.7 g of tetrafluoroethylene [TFE] were charged therein and the inside temperature was elevated to 70° C. Reaction was continued until the reaction system pressure reached to 0 kg/cm² gage, and then the autoclave was cooled down to room temperature, whereby 1,300 g of an aqueous latex (solid concentration: 30 wt. %) was obtained.

Total amount of the thus obtained aqueous latex was admixed with an aqueous 5% wt. potassium alum solution to coagulate the formed graft copolymer, followed by water washing and drying. For the organic solvent-insoluble, fluorine-containing graft copolymer obtained in a yield of 400 g, copolymer composition was calculated from the elemental analysis (C, H, F and Cl) and material balance (graft polymerization yield being presumed to be 100%), and the melting point was determined (DSC method). By FT-IR analysis, the presence of absorption due to $CF_3$— was confirmed at 940 cm$^{-1}$.

The fluorine-containing graft copolymer was subjected to compression molding at 330° C. for 6 minutes to form sheets having a thickness of 2 mm and P-24 O-rings. Furthermore, 100 parts by weight of the fluorine-containing graft copolymer, 2 parts by weight of triallyl isocyanurate and one part by weight of 2,5-dimethyl-2,5-bis(t-butylperoxy) hexane were roll kneaded, and the thus obtained kneading product was press vulcanized at 180° C. for 2 minutes to vulcanization mold similar sheets and O-rings to the above. For these (vulcanization) molding products, normal state physical properties (Shore hardness A according to ASTM D-2240-81, and 100% modulus, tensile strength and elongation according to ASTM D-412-83) and compression set (for molding products, O-rings having a ring wire diameter of 3.5 mm which were 25% compressed at 100° C. or 150° C. for 22 hours, and for vulcanization molding products, O-rings having a ring wire diameter of 3.5 mm, which were 25% compressed at 200° C. for 70 hours) were determined. Coloring of the molding products was visually observed.

EXAMPLE 2

In Example 1, the amount of 1,4-diiodoperfluorobutane used at the first stage polymerization was changed to 10.00 g, and 3.14 g of $CF_2$=CHBr was further used. Elemental analysis of the resulting binary copolymer was made for iodine and bromine. Vulcanization time of the fluorine-containig graft copolymer was changed to 5 minutes.

EXAMPLE 3

In Example 1, 6.75 g of 1-iodo-2-bromoethane was used in place of 1,4-diiodoperfluorobutane, and 3.14 g of $CF_2$=CHBr was further used. Furthermore, the charge amount of $CF_2$=$CFOCH_2C_2F_5$ as a graft monomer was changed to 10.8 g and that of TFE as a graft monomer was also changed to 89.2 g. Elemental analysis of the resulting binary copolymer was made for iodine and bromine, and its compression molding temperature was changed to 290° C. Furthermore, press vulcanization time of the fluorine-containing graft copolymer was changed to 10 minutes.

EXAMPLE 4

In Example 1, a gas mixture consisting of 55% by mole of VdF and 45% by mole of HFP (hexafluoropropene) was used as an initial charge gas, and a gas mixture consisting of 70% by mole of VdF and 30% by mole of HFP was used as an additional gas. During the polymerization reaction, the inside gas pressure was maintained at 30 kg/cm² gage. Compression molding of the resulting binary copolymer was carried out at 310° C., and the solution viscosity η sp/c of the fluorine-containing graft copolymer was determined at 35° C. as a 1% methyl ethyl ketone (MEK solution.

Comparative Example 1

In Example 1, the charge amount of TFE as a graft monomer was changed to 100 g, and compression molding of the resulting binary copolymer was carried out at 340° C. for 60 minutes. Press vulcanization of the fluorine-containing graft copolymer was carried out at 180° C. for 10 minutes. However, no evaluable molding products were obtained by the compression molding and the press vulcanization.

Comparative Example 2

In Example 1, 6.75 g of 1-iodo-2-bromoethane was used in place of 1,4-diiodoperfluorobutane, and 3.14 g of $CF_2$=CHBr was further used. Still furthermore, the charge amount of $CF_2$=$CFOCH_2C_2F_5$ as a graft monomer was changed to 16.7 g and that of TFE as a graft monomer was changed to 83.3 g. Elemental analysis of the resulting binary copolymer was made for iodine and bromine, and its compression molding temperature was changed to 290° C. Press vulcanization time of the fluorine-containing graft copolymer was changed to 10 minutes.

Results of determination in the foregoing Examples and Comparative Examples are shown in the following Table together with raw material charge amounts.

TABLE

| | Example 1 | Example 2 | Example 3 | Example 4 | Comp. Ex. 1 | Comp. Ex. 2 |
|---|---|---|---|---|---|---|
| First stage polymerization reaction | | | | | | |
| [Initial charge gas composition] | | | | | | |
| VdF (mol. %) | 70 | 70 | 70 | 55 | 70 | 70 |
| CTFE (mol. %) | 30 | 30 | 30 | | 30 | 30 |
| HFP (mol. %) | | | | 45 | | |
| [Iodine (bromine)-containing compound] | | | | | | |
| $I(CF_2)_4I$ (g) | 14.98 | 10.00 | | 14.98 | 14.98 | |
| $ICF_2CF_2Br$ (g) | | | 6.75 | | | 6.75 |
| $CF_2=CHBr$ (g) | | 3.14 | 3.14 | | | 3.14 |
| [Additional gas composition] | | | | | | |
| VdF (mol. %) | 70 | 70 | 70 | 70 | 70 | 70 |
| CTFE (mol. %) | 30 | 30 | 30 | | 30 | 30 |
| HFP (mol. %) | | | | 30 | | |
| [Copolymer composition] | | | | | | |
| VdF (mol. %) | 72 | 72 | 72 | 73 | 72 | 72 |
| CTFE (mol. %) | 28 | 28 | 28 | | 28 | 28 |
| HFP (mol. %) | | | | 27 | | |
| Iodine content (m mole/g) | 0.030 | 0.021 | 0.011 | 0.028 | 0.031 | 0.013 |
| Bromine content (m mole/g) | | 0.019 | 0.023 | | | 0.022 |
| [Copolymer solution viscosity] | | | | | | |
| $\eta$ sp/c (dl/g) | 0.95 | 1.03 | 1.10 | 0.88 | 0.94 | 1.10 |
| Second stage polymerization reaction | | | | | | |
| [Charged monomer composition] | | | | | | |
| TFE (mol. %) | 99 | 99 | 95 | 99 | 100 | 92 |
| $CF_2=CFOCH_2C_2F_5$ (mol. %) | 1 | 1 | 5 | 1 | 0 | 8 |
| [Ratio of first stage/second stage] | | | | | | |
| Ratio by weight | 75/25 | 75/25 | 75/25 | 75/25 | 75/25 | 75/25 |
| [Copolymer composition] | | | | | | |
| VdF (mol. %) | 57.2 | 57.2 | 57.7 | 56.7 | 57.0 | 58.2 |
| CTFE (mol. %) | 22.2 | 22.2 | 22.5 | | 22.2 | 22.6 |
| HFP (mol. %) | | | | 21.0 | | |
| TFE (mol. %) | 20.4 | 20.4 | 18.8 | 22.1 | 20.8 | 17.7 |
| $CF_2=CFOCH_2C_2F_5$ (mol. %) | 0.2 | 0.2 | 1.0 | 0.2 | | 1.5 |
| [Copolymer melting point] | | | | | | |
| Tm (° C.) | 317 | 317 | 283 | 290 | 330 | unclear |
| Molding product | | | | | | |
| [Normal state physical properties] | | | | | | |
| Hardness (Shore A) (Point) | 67 | 69 | 63 | 58 | | 60 |
| 100% Modulus (MPa) | 2.5 | 3.3 | 2.0 | 1.2 | | 0.8 |
| Tensile strength (MPa) | 5.0 | 6.0 | 3.2 | 2.7 | | 2.0 |
| Elongation (%) | 430 | 410 | 500 | 1100 | | 1200 |
| [Compression set] | | | | | | |
| 100° C., 22 hrs (%) | 33 | 29 | 31 | 45 | | 58 |
| 150° C., 22 hrs (%) | 40 | 38 | 38 | 60 | | 68 |
| [Coloring] | | | | | | |
| Visual | Light Brown | Light yellow | Colorless | Light brown | Brown | Colorless |
| Vulcanization molding Product | | | | | | |
| [Normal state physical properties] | | | | | | |
| Hardness (Shore A) (Point) | 74 | 76 | 69 | 68 | | 68 |
| 100% Modulus (MPa) | 8.9 | 10.0 | 6.0 | 5.8 | | 6.0 |
| Tensile strength (MPa) | 17.3 | 18.0 | 15.0 | 16.0 | | 14.8 |
| Elongation (%) | 240 | 220 | 270 | 260 | | 280 |
| [Compression set] | | | | | | |
| 200° C., 70 hrs (%) | 36 | 33 | 33 | 41 | | 50 |

What is claimed is:

1. A process for producing a fluorine-containing graft copolymer which comprises copolymerizing a mixture of at least two kinds of monomers selected from the group consisting of fluorinated monomers and propylene in the presence of a saturated iodine-containing compound represented by the following general formula:

RI$_n$ where R is a fluorohydrocarbon group, a chlorofluorohydrocarbon group, a chlorohydrocarbon group or a hydrocarbon group and n is 1 or 2, or an iodine and bromine-containing compound represented by the following general formula:

I$_n$Br$_m$R where R is a fluorohydrocarbon group, a chlorofluorohydrocarbon group, a chlorohydrocarbon group or a hydrocarbon group and n and m are each 1 or 2, and further graft polymerizing the resulting copolymer with tetrafluoroethylene and a polyfluorovinyl ether represented by the following general formula:

CF$_2$=CFOCX$_2$(CF2)$_p$Y where X is a hydrogen atom or a fluorine atom, Y is a hydrogen atom or a fluorine atom and p is an integer of 0 or 1 to 3, wherein the polyfluorovinyl ether is used in a proportion of about 0.5 to about 6% by mole in total amounts of tetrafluoroethylene and polyfluorovinyl ether.

2. A process according to claim 1, wherein the fluorinated monomer is vinylidene fluoride, hexafluoropropene, tetrafluoroethylene, chlorotrifluoroethylene or perfluoro (methyl vinyl ether).

3. A process according to claim 1, wherein the fluorinated monomers are mixture of vinylidene fluoride and chlorotrifluoroethylene.

4. A process according to claim 1, wherein the mixture of at least two kinds of monomers selected from the group consisting of fluorinated monomers and propylene contains at least one kind of monomer selected from hexafluoropropene, chlorotrifluoroethylene, perfluoro (methyl vinyl ether) and propylene in a proportion of about 10 to about 80% by mole in the monomer mixture.

5. A process according to claim 1, wherein an unsaturated iodine-containing compound or an unsaturated bromine-containing compound (B), together with the saturated iodine-containing compound or the iodine and bromine-containing compound (A), is used in a molar ration of (B) to (A) of about 2/1 to about 1/2.

6. A process according to claim 5, wherein the unsaturated iodine-containing compound is iodotrifluoroethylene or perfluoro(2-iodoethyl vinyl ether).

7. A process according to claim 5, wherein the unsaturated bromine-containing compound is 2-bromo-1,1-difluoroethylene, bromotrifluoroethylene, 4-bromo-3,3,4,4-tetrafluorobutene-1 or perfluoro(2-bromoethyl vinyl ether).

8. A process according to claim 1, wherein the monomers to be used in the first stage polymerization reaction and the monomers to be used in the second stage graft reaction are used in a ratio of the former to the latter of about 50/50 to about 90/10 by weight.

9. A process according to claim 1, wherein the first stage polymerization reaction is carried out by emulsion polymerization or solution polymerization, and the resulting aqueous latex or solution is cooled and, after purging unreacted monomers, admixed with tetrafluoroethylene and polyfluorovinyl ether, thereby carrying out the graft copolymerization reaction.

10. A fluorine-containing graft copolymer produced by a process according to claim 1.

11. A fluorine-containing graft copolymer according to claim 10 for use as molding materials for sealing materials.

12. A fluorine-containing graft copolymer composition, which comprises a fluorine-containing graft copolymer according to claim 10 and an organic peroxide.

* * * * *